(12) United States Patent
Roth et al.

(10) Patent No.: US 10,308,819 B2
(45) Date of Patent: Jun. 4, 2019

(54) ANTICORROSIVE COATING COMPOSITION

(71) Applicant: Ewald Dörken AG, Herdecke (DE)

(72) Inventors: Marcel Roth, Düsseldorf (DE); Vanessa Kurze, Witten (DE); Marcus Lämmer, Wuppertal (DE); Sandra Böhm, Ennepetal (DE); Verena Grossmann, Herdecke (DE); Gerhard Reusmann, Essen (DE)

(73) Assignee: Ewald Dörken AG, Herdecke (DE)

( * ) Notice: Subject to any disclaimer, the term of this patent is extended or adjusted under 35 U.S.C. 154(b) by 47 days.

(21) Appl. No.: 15/288,288

(22) Filed: Oct. 7, 2016

(65) Prior Publication Data

US 2017/0101541 A1    Apr. 13, 2017

(30) Foreign Application Priority Data

Oct. 9, 2015 (EP) .................................. 15189152

(51) Int. Cl.
| | |
|---|---|
| *C09D 5/10* | (2006.01) |
| *C09D 183/04* | (2006.01) |
| *C08K 3/08* | (2006.01) |
| *C08G 77/58* | (2006.01) |
| *C08G 77/18* | (2006.01) |

(52) U.S. Cl.
CPC ............. *C09D 5/106* (2013.01); *C08G 77/58* (2013.01); *C08K 3/08* (2013.01); *C09D 5/10* (2013.01); *C09D 183/04* (2013.01); *C08G 77/18* (2013.01); *C08K 2003/0812* (2013.01); *C08K 2003/0862* (2013.01); *C08K 2003/0881* (2013.01); *C08K 2003/0893* (2013.01); *C08K 2201/019* (2013.01)

(58) Field of Classification Search
CPC ........ C09D 5/106; C09D 183/04; C09D 5/10; C08K 3/08
USPC .......................................................... 428/323
See application file for complete search history.

(56) References Cited

U.S. PATENT DOCUMENTS

| | | | | |
|---|---|---|---|---|
| 4,474,606 A | * | 10/1984 | McKaveney | C09D 5/10 |
| | | | | 106/1.17 |
| 5,432,007 A | | 7/1995 | Naito | |
| 2009/0017315 A1 | * | 1/2009 | Hamilton | C09D 5/08 |
| | | | | 428/447 |
| 2015/0299515 A1 | * | 10/2015 | Tanino | C09D 183/06 |
| | | | | 524/102 |

FOREIGN PATENT DOCUMENTS

| | | | |
|---|---|---|---|
| EP | 1646695 B1 | | 4/2006 |
| JP | 2005054073 A | | 3/2005 |
| JP | 2007505166 A | | 3/2007 |
| KR | 1020080083670 | | 9/2008 |
| WO | 2007104121 A1 | | 9/2007 |
| WO | WO2014/077205 | * | 5/2014 |

* cited by examiner

*Primary Examiner* — Deve E Valdez
(74) *Attorney, Agent, or Firm* — Edward E. Sowers; Brannon Sowers & Cracraft PC

(57) ABSTRACT

The invention relates to an anticorrosive coating composition. In order to provide an anticorrosive coating composition which cures at room temperature, provision is made for the anticorrosive coating composition to comprise at least one polysiloxane and metal particles and also at least one crosslinker, the coating composition crosslinking chemically at room temperature. The invention further relates to a method for applying the anticorrosive coating composition and also to the coated substrate.

14 Claims, No Drawings

ANTICORROSIVE COATING COMPOSITION

CROSS-REFERENCE TO RELATED APPLICATION

This application claims the benefit of European Application No. EP 15 189 152.0 filed on Oct. 9, 2015, and incorporates all by reference herein, in its entirety.

BACKGROUND

The present invention pertains to the technical field of corrosion control.

The present invention relates in particular to an anticorrosive coating composition and also to a method for applying the anticorrosive coating composition.

The present invention further relates to a metal substrate provided with an anticorrosive coating.

In connection with the invention, particular interest attaches to coating compositions which cure at room temperature, of the kind disclosed in EP 0 591 955 B1, for example. Key elements of the coating composition disclosed therein are a polysiloxane as binder and also an organic boron compound as crosslinking agent, the design of the coating composition being such that the coating dries at room temperature, albeit with a considerable required time of more than 70 hours at room temperature.

SUMMARY

The organic boron compounds used in the prior art are unwanted on environmental grounds and are to be avoided.

To achieve this object, an anticorrosive coating composition according to Claim 1 and a method for applying the anticorrosive coating composition according to Claim 10 are proposed.

It is self-evident that characteristics, features, versions and embodiments, and also advantages or the like, which are given below, in order to avoid unnecessary repetition, in respect only of one aspect of the invention are of course valid correspondingly in respect of the other aspects of the invention, even when such is not explicitly stated.

Moreover, it is self-evident that when values, numbers and ranges are stated below, the relevant value, number and range details should not be held to be restrictive; it is instead obvious to the skilled person that in certain instances or particular applications, deviations from the stated ranges or details are possible, without leaving the scope of the present invention.

It is the case, moreover, that all value details or parameter details or the like that are given below may be ascertained or determined using standardized or explicitly stated determination methods or by methods of determination that are familiar per se to the person skilled in this art.

It is also self-evident, moreover, that all weight-based or quantity-based percentages will be selected by the skilled person so as to result in a total of 100%; this, however, is obvious.

This having been established, the present invention is described in more detail below.

DESCRIPTION

A subject of the present invention—according to a first aspect of the present invention—is therefore an anticorrosive coating composition comprising at least one polysiloxane and metal particles and also at least one crosslinker, the coating composition crosslinking chemically at room temperature.

A feature of the anticorrosive coating composition of the invention is a simple composition in which the use of organoboron compounds is shunned. The composition of the invention is easy to employ and cures on the substrate within a short time at room temperature. Features of the composition of the invention, besides the simple composition, are particularly easy processing and applicability.

The coating composition can be formulated without or with only a small fraction of organic solvents, particularly the VOCs (Volatile Organic Compounds), which are problematic from standpoints of environmental protection and health preservation, and are to be avoided. The coating composition of the invention is consequently also unobjectionable in terms of occupational hygiene considerations. Furthermore, costly and complex apparatus for collecting the organic solvents is not needed.

Generally speaking, the coating composition is in particular at least substantially free from water, and preferably is free from water.

Moreover, in the context of the present invention, provision is customarily made for the coating composition in particular to be at least substantially free from organic solvents.

It is nevertheless possible for the coating composition to comprise organic solvents, more particularly VOCs, in amounts of at most 5 wt %, more particularly at most 3 wt %, based on the coating composition. It is equally possible for the coating composition to comprise organic solvents, more particularly VOCs, in amounts of 0.01 to 5 wt %, more particularly 0.1 to 3 wt %, based on the coating composition. Organic solvents are normally admixed to the coating composition only for the purpose of adjusting the viscosity, as will be observed below.

The anticorrosive coating composition is therefore preferably a low-VOC or a VOC-free coating composition.

According to one preferred embodiment, the coating composition crosslinks in the presence of atmospheric moisture. Since the crosslinking reaction of these systems does not begin to any significant extent until the coating composition comes into contact with atmospheric moisture, the anticorrosive coating composition of the invention offers a sufficiently long pot life, in other words a sufficiently long time within which the composition can be worked. Moreover, the composition of the invention is of almost unlimited storage life, subject always to the proviso that the coating composition is protected from the ingress of water or moisture, especially atmospheric moisture. If the container is secured effectively against the ingress of moisture, more particularly atmospheric moisture, the container, after having been broached, can be kept for much longer than a week.

The coating composition generally crosslinks within 300 minutes, more particularly 150 minutes, preferably 60 minutes. Under favourable application conditions, crosslinking is over after 30 minutes. More particularly the coating composition crosslinks within a period of 1 to 300 minutes, more particularly 2 to 150 minutes, preferably 3 to 60 minutes, more preferably 5 to 30 minutes.

The coating composition of the invention cures within a broad room temperature or ambient temperature range. Possible in this context are temperatures of not less than −10° C. and not more than 45° C. Preferred are temperatures from 5° C. to 35° C., and particularly preferred is the temperature range from 15 to 25° C. The concept of curing at room temperature or ambient temperature is defined, in the context of the present invention, such that no mechanical drying equipment, such as apparatus for thermal curing or for radiation curing (oven or electron beam apparatus), for example, is necessary for the curing of the anticorrosive coating composition on the substrate, provided that the ambient temperature is −10° C. to 45° C. The curing without mechanical drying equipment allows coating to take place within rooms or halls at room temperature, but also allows for the coating of constructions outdoors at ambient temperature.

The reaction begins at low temperatures, and rapid curing is found even at room or ambient temperature. The rate of the curing is heavily dependent, in the case of the systems which crosslink in the presence of atmospheric moisture, on the atmospheric humidity of the room (in the case of coating in rooms) or of the surroundings (in the case of coating outside rooms). Coating compositions which crosslink in the presence of atmospheric moisture exhibit optimum curing customarily when the water content of the air is 2 g/m$^3$ to 14 g/m$^3$, preferably 5 g/m$^3$ to 11 g/m$^3$.

The anticorrosive coating composition of the invention, then, comprises at least one polysiloxane, metal particles, and at least one crosslinker, and the coating composition crosslinks at room temperature. The coating composition is preferably free from water, contains no organic solvents or only small amounts thereof, and crosslinks chemically in the presence of atmospheric moisture. The coating composition of the invention is free from organoboron compounds, and preferably entirely free from boron.

The anticorrosive coating composition of the invention may comprise a liquid polysiloxane in undiluted form. The polysiloxane is preferably a solvent-free liquid of low viscosity. The crosslinker as well is present preferably in a liquid, undiluted form, in other words with 100% active content. Polysiloxane and crosslinker are prepared together with the metal particles by mixing, preferably in the form of a water-free one-component system, and stored thus prior to application.

On application to a substrate, preferably to a metallic substrate, of a system which crosslinks in the presence of atmospheric moisture, contact with the water present in the air (with the atmospheric moisture) leads to a polycondensation reaction which results in the chemical crosslinking, also referred to as curing or setting.

With regard now to the substrates which can be provided—more particularly coated—with the coating composition of the invention, they may have various different forms and be made from any of a very wide variety of materials. The material of which the substrate consists is customarily selected from the group of glass, ceramic, mineral or organic surfaces, such as plastic or paper, for example, and metal, and also mixtures thereof, preference being given to substrates which comprise or consist of metal.

Particularly preferred are iron-containing substrates, more particularly steel substrates.

Polysiloxane and crosslinker together form a reactive binder system. The fraction of the polysiloxane in this reactive binder system is more than 50 wt %; the fraction of the crosslinker is less than 50 wt %, based on the binder used. According to one preferred version of the invention, the fraction of the polysiloxane in the reactive binder system is more than 70 wt %, more particularly more than 80 wt %, preferably more than 90 wt %, and the complementary fraction of the crosslinker is less than 30 wt %, more particularly less than 20 wt %, preferably less than 10 wt %.

The coating composition customarily comprises the reactive binder system, consisting in particular of polysiloxane and crosslinker, in a fraction of not more than 30 wt %, preferably of not more than 20 wt %, more preferably with a fraction of not more than 10 wt %. In the context of the present invention, provision may be made for the coating composition to comprise the reactive binder system in amounts of 2 to 30 wt %, more particularly 3 to 20 wt %, preferably 4 to 10 wt %, based on the coating composition.

In general the coating composition comprises a reactive polysiloxane. In this context it has been found appropriate for the polysiloxane to be selected from silanol-functionalized polysiloxanes and alkoxy-functionalized polysiloxanes and also mixtures thereof.

These functionalized polysiloxanes may optionally be combined with alkoxy-, acetoxy-, epoxy-, oxime- or amine-terminated silanes. Typically it is possible for example to use silanol-terminated dimethylsiloxanes, silanol-terminated diphenylsiloxanes, silanol-terminated polytrifluoropropylmethylsiloxanes, silanol-terminated trimethylsilyl-modified Q resins, silanol-terminated vinylmethylsiloxane copolymers, or methoxy-functionalized siloxanes, individually or in a mixture, as polysiloxanes. Such siloxanes are available for example from Gelest Inc. under the brand names DMS, PDS or FMX and also SQT, and are also available from Dow Corning (brand name: US CF), Evonik Industries (brand name: Silicophen) or Wacker (brand name: Silres). For the aforementioned polysiloxanes having terminal reactive groups, a rapid polycondensation reaction occurs on ingress of atmospheric moisture at an ambient temperature of −10° C. to 45° C.

Particularly good results are obtained in the context of the present invention if the polysiloxane has a weight-average molecular weight $M_w$ in the range from 200 to 50 000 g/mol, more particularly 500 to 30 000 g/mol, preferably 800 to 25 000 g/mol, more preferably 1000 to 20 000 g/mol, very preferably 1500 to 18 000 g/mol.

According to one advantageous version, the polysiloxane used in accordance with the invention has a dynamic viscosity by the Brookfield method at 20° C. of not more than 10 000 mPas, preferably not more than 1000 mPas, more preferably of at least 50 mPas. Provision may also be made for the polysiloxane to have a dynamic viscosity by the Brookfield method at 20° C. in the range from 10 to 10 000 mPas, more particularly 20 to 5000 mPas, preferably 30 to 300 mPas, more preferably to 100 mPas. Since the viscosity of the liquid polysiloxane used is an influencing factor on the processing properties of the anticorrosive coating composition, a low viscosity is preferred.

Crosslinkers used generally comprise a component or a mixture of components selected from the group of reactive silanes, silane hydrolysates, titanates, zirconates, organometallic compounds, acids and bases and also mixtures thereof. The crosslinker is preferably selected from reactive silanes, silane hydrolysates, titanates, zirconates, organometallic compounds and also mixtures thereof, more preferably reactive silanes, titanates, zirconates, organometallic compounds and also mixtures thereof. More particularly the last-recited crosslinkers are incorporated into the polymer framework resulting in the polycondensation; furthermore, they react with the polysiloxane in a short time in the presence of atmospheric moisture at room temperature.

Customarily the silane is selected from the group of alkoxy-, acetoxy-, epoxy-, vinyl-, oxime-, mercapto- and amino-functionalized silanes, more particularly aminosilanes and/or alkoxysilanes, preferably alpha-aminoalkoxysilanes.

The silane hydrolysate is generally selected from silanol-, alkoxy- and amino-functionalized silanes and mixtures thereof.

According to one preferred embodiment of the present invention, the silane or the silane hydrolysate has a weight-average molecular weight $M_w$ below 2000 g/mol. Provision may be made in particular for the silane or the silane hydrolysate to have a weight-average molecular weight $M_w$ in the range from 200 to 3000 g/mol, more particularly 250 to 2500 g/mol, preferably 250 to 2000 g/mol.

The use of silanes and/or of oligomeric silane hydrolysates of low molecular weight, having a weight-average molecular weight $M_w$ of below 2000 g/mol, allows the viscosity of the coating composition to be set in a targeted way.

Based on the reactive binder system, silanes and/or silane hydrolysates for establishing the viscosity may be used in a fraction of up to 10 wt %, preferably in a fraction of up to 5 wt %. Even in small amounts, of 0.5 wt % to 1 wt %, for example, silanes are active; the skilled person is able to determine the minimization and also the optimization of the use of silane, in relation to the adjustment of the viscosity of the coating composition, in a few tests.

With regard to the titanates and zirconates, preference is given to using organic titanium and zirconium compounds. Advantageous compounds are alkyltrialkoxy, trialkylalkoxy or tetraalkoxy compounds or else dialkyldialkoxy compounds of titanium or zirconium. These titanium-alkoxy or zirconium-alkoxy compounds may each be used individually or in a mixture. Suitable substituents of these alkoxy compounds are phenyl, ethyl, methyl and vinyl groups, the reactivity of the alkoxy compound rising in the sequence of the aforesaid groups. Typical crosslinkers are tetra-n-butyl titanate, tetraisopropyl titanate, vinyl tri-n-butyl titanate. These crosslinkers are readily miscible with the polysiloxane compound in the preparation of the anticorrosive coating composition.

In the context of the present invention, provision is customarily made for the organic metal compound to be selected from organometallic compounds, more particularly alkoxides, of aluminium, iron, zinc and tin and also a mixture thereof. These organometallic crosslinkers may be present inherently or additionally to the aforementioned crosslinkers in the coating composition, but are preferably used in small amounts with other crosslinkers and serve as reaction initiators on account of their high reactivity.

Alternatively to or in combination with the aforementioned crosslinkers it is also possible for organic or inorganic acids or alkalis to be used as crosslinkers. Suitable examples include phosphoric acid, nitric acid, hydrochloric acid, sulphuric acid, formic acid, succinic acid, acetic acid, peracetic acid, oxalic acid or citric acid, in each case individually or in combination with one another. A typical alkali is sodium hydroxide solution.

A key constituent of the anticorrosive coating composition are metal particles. Such metal particles, more particularly zinc, aluminium, magnesium, manganese or nickel, or else a mixture or an alloy of these metals, are known and customary for use in anticorrosive coatings. Employed with particular frequency are zinc and aluminium in a mixture or as an alloy. They endow the coating applied to the substrate with cathodic protection.

In the context of the present invention, provision is customarily made for the anticorrosive coating composition to comprise a fraction of metal particles in the range from 70 to 98 wt %, more particularly 80 to 96 wt %, preferably 90 to 96 wt %, based on the coating composition. According to one advantageous version of the invention, the anticorrosive coating composition comprises at least 70 weight % of metal particles, preferably at least 80 weight % of metal particles, more preferably at least 90 weight % of metal particles. Surprisingly it is possible for these high proportions of metal particles to be readily anchored firmly on a metallic substrate as a result of the corresponding fraction of polysiloxane and crosslinker, i.e. of reactive binder, as coating.

Metal pigments, especially commercially available metal pigments, have often been subjected to surface treatment. The surface treatment takes place customarily in the form of a coating, with the surface of the metal particles being coated with metal oxides, such as aluminium oxide, titanium oxide, zirconium oxide, chromium oxide, nickel oxide or oxides of the rare earths, for example, or else with silicon dioxide, and also with inorganic or organic polymers, such as fatty acids, for example, more particularly stearic acid or oleic acid. Particularly customary in this context is a treatment or coating with stearic acid in order to protect the metal pigments from oxidation. For the purposes of the present invention, it is possible to use surface-treated metal particles, in particular without restriction.

Provision may advantageously be made for the metal particles to be spherical. Spherical metal particles are available with small diameters, as for example with an average, volume-weighted size of less than 10 μm, preferably of less than 5 μm, advantageously with a size of greater than 2 μm, typically with a size of 2 μm to 3 μm. On a substrate, especially a metallic substrate, a layer thickness of up to 100 μm, preferably of up to 50 μm, advantageously of up to 25 μm, preferably of up to 10 μm, more preferably of 5 μm or more, may easily be produced using spherical metal particles of this kind. As cathodically active metal particles, the metal particles afford good corrosion control.

Up to 80 weight % of the metal particles, especially the spherical metal particles, used for the coating composition of the invention may be formed and/or replaced by lamellar metal particles. The metals, alloys or mixtures of metals used for the lamellar metal particles are the same as those as used for the metal particles in general, namely zinc, aluminium, magnesium, manganese and nickel.

A particular effect of the lamellar metal particles is to improve the anticorrosive effect, but also the settling behaviour, of the anticorrosive coating composition.

According to one particular embodiment of the present invention, it is possible for the coating composition to contain no spherical metal particles. In particular it is possible for the coating composition to comprise non-spherical, more particularly lamellar, metal particles, in amounts of 70 to 98 weight %, more particularly 80 to 96 weight %, preferably 90 to 96 weight %, based on the coating composition. As the applicant has surprisingly discovered, it is possible to obtain coating compositions having the aforementioned viscosities if no spherical metal particles at all are used. If the coating composition contains no spherical metal particles, it is vital that the metal particles are not treated with fatty acids, especially with stearic acid. With non-spherical, preferably lamellar, metal particles which have not been treated with fatty acids, the viscosity of the coating composition can be adjusted into the ranges stated above, with at the same time an increase in the corrosion resistance of the resulting coatings.

According to one preferred version of the invention, the anticorrosive coating composition is produced, stored and applied as a one-component system.

Alternatively, particularly if settling of the metal particles is thought likely to occur, the anticorrosive coating composition of the invention can be produced and stored as a 2-component system. In that case, prior to application, a first component, consisting of polysiloxane and crosslinker, and a second component, consisting of metal particles, are mixed and then applied.

Up to 15 weight %, preferably up to 5 weight %, of the metal particles used in the anticorrosive coating composition may be replaced by other metal particles such as, for example, colouring particles (pigments) or by other functional particles, as for example lubricants, which are present in solid form, such as molybdenum sulphide or polytetrafluoroethylene, or by particles which influence the conductivity, such as carbon black or nanospheres, for example, or by particles which influence the weldability. Colouring or functional particles may each be used individually or in a mixture in the anticorrosive coating composition.

The anticorrosive coating composition of the invention preferably contains no water. Accordingly, the viscosity, as elucidated above, can be adjusted only via the reactive binder system, as for example with silanes and silane hydrolysates.

Likewise for the purpose of adjusting the viscosity, the water-free anticorrosive coating composition may comprise organic solvents. According to one advantageous version of the invention, the coating composition contains not more than 3 weight % of solvents, and so may be identified as a low-VOC coating composition. The coating composition of the invention is preferably VOC-free, meaning that it contains only very small amounts of solvents, neither low-boiling nor high-boiling solvents. Particular preference is given to the coating composition of the invention being solvent-free. If nevertheless desired, customary solvents are used, such as methoxypropyl acetate (MPA) dibasic ester or white spirit, for example.

Further additives such as dispersing aids, anti-settling agents, defoamers, rheological assistants, corrosion inhibitors or adhesion promoters, which are known from the prior art, may each individually or in combination with one another be a constituent of the coating composition.

A further subject of the present invention—according to a second aspect of the present invention—is a method for coating a metal substrate with an anticorrosive coating composition, more particularly as described above, comprising the following steps:
(a) cleaning the metal substrate,
(b) applying the anticorrosive coating composition, and
(c) curing the anticorrosive coating to a dust-dry state at room temperature within a period of up to 300 minutes.

It is evident that the method for applying the coating composition of the invention is particularly simple to implement.

The cleaning of the metal substrate is important for effective adhesion of the anticorrosive coating. Typical cleaning steps are mechanical cleaning, for example by blasting with particles of blasting material, such as glass particles, stainless steel pellets or garnet sand pellets, or mechanical cleaning, such as abrading or brushing, for example, of the metal substrate. However, degreasing, washing with solvent or water, optionally with addition of cleaning product, or an alkaline or acidic wash are also suitable for preparing the surface of the metal substrate for the anticorrosive coating. Particularly preferred is a combination of blasting with particles of blasting material, followed by hot alkaline degreasing in conjunction with mechanical cleaning.

The anticorrosive coating composition can be applied directly to the cleaned surface of the metal substrate. Alternatively, the cleaned surface of the metal substrate may be pretreated.

Customarily, in the context of the present invention, cleaning is followed by the application of a pretreatment layer, more particularly a conversion layer, to the metallic substrate.

As a pretreatment it is possible to apply a pretreatment composition to the cleaned surface of the metal substrate that produces a pretreatment layer on the substrate.

Particularly good results are obtained in the context of the present invention if the pretreatment layer is obtainable by phosphatizing and/or chromating.

This pretreatment composition may be a conversion coating composition, as for example a phosphatizing composition. Known and suitable forms include degreasing-phosphatizing, trication phosphatizing, zinc phosphatizing or iron phosphatizing.

According to one preferred embodiment, the pretreatment layer is obtainable by treating the substrate with a pretreatment composition, more particularly a phosphatizing composition. In this context it has proved to be appropriate if the pretreatment composition comprises phosphoric acid and optionally at least one compound of an element selected from the group of titanium, zirconium, nickel, manganese, zinc, silicon, magnesium, aluminium, iron, vanadium, molybdenum and tungsten and mixtures thereof.

Alternatively the pretreatment composition may be a chromating composition, preferably with chromium(III) ions. The pretreatment composition may also comprise titanium compounds or zirconium compounds. Acidic or alkaline passivation is another suitable pretreatment. Likewise suitable is a combination of pretreatments—for example, an acidic passivation followed by an alkaline passivation.

A particularly advantageous pretreatment is one wherein first of all there is a conversion treatment. The conversion treatment is then followed by a primer, which improves the adhesion of the coating composition of the invention to the metallic substrate, generally a silicon-based primer, as for example a primer based on a silicate, a silane or siloxane, crosslinked for example in a sol-gel layer. The silicon-based primer may also comprise mixtures or compounds of the aforesaid silicates, silanes or siloxanes. These advantageously combined pretreatment layers are unusually thin, having a layer thickness of less than 1 µm. The combination of two pretreatments, described here as advantageous, improves the wet adhesion of the coating of the invention to the metallic substrate, particularly if, before the silicon-based primer, the metallic substrate is phosphatized. The improved adhesion properties of the coating composition of the invention are evident in particular during the salt spray test.

The pretreatment compositions are liquid in each case; they are applied to the cleaned metal substrate by dipping, rolling, brushing, pouring or other customary application techniques. Pretreatment may be followed by drying of the metal substrate.

Preference is given to providing the metal substrate with a pretreatment before the anticorrosive coating composition is applied, especially since it has emerged that the anticorrosive coating composition of the invention also develops the cathodic control effect when a pretreatment—for example, phosphatizing or passivation—has been applied to the surface of the metal substrate beforehand.

According to one advantageous version of the invention, the coating of the invention, which on account of the cathodic reactive metal particles it contains is also referred to as basecoat, has at least one further coating, also called topcoat, applied over it. This is usually a further coating composition, which contains no cathodically active metal particles, but which frequently has the same binder or the same binder system as the basecoat. In one simple version, therefore, the topcoat may comprise only a binder or a binder system, without further additions or additives. Alternatively the topcoat may have an entirely different binder or binder system; the only prerequisite for the suitability of this alternative binder or binder system is that it adheres to the anticorrosive coating. The topcoat is preferably likewise a coating which cures at room temperature or ambient temperature. However, the topcoat may also have had colouring or other additives added to it. Typical additions are colouring pigments, solid-state lubricants such as molybdenum sulfide or polytetrafluoroethylene, for example, which are present in particle form. Examples of suitable topcoats are sol-gel coating compositions, organic 2-component epoxide compositions, polyurethane varnishes, radically crosslinking systems such as acrylates, for example, or else aqueous organic dispersions or silicatic topcoats.

For further details relating to this aspect of the invention, in order to avoid unnecessary repetition, reference may be made to the above observations concerning the coating composition of the invention, which apply correspondingly in respect of the method of the invention.

Lastly, a further subject of the present invention—according to a third aspect of the present invention—is a metal substrate coated with an anticorrosive coating comprising a matrix of a polysiloxane and at least one crosslinker and also metal particles.

For further details relating to this aspect of the invention, in order to avoid unnecessary repetition, reference may be made to the above observations concerning the other aspects of the invention, which apply correspondingly in respect of the metal substrate of the invention.

Below, details of the invention are elucidated further, with reference to working examples:

A typical formula for the anticorrosive coating composition of the invention envisages:

| | |
|---|---|
| 14 wt % binder | methylpolysiloxane with methoxy and/or ethoxy functionality, having a viscosity of 60 to 75 mPas; |
| 1 wt % crosslinker | acetyl-aceto-titanate, for example: Tyzor AA 105, from Dorf Ketal; |
| 80 wt % zinc dust | spherical metal particles having an average size of 6 μm, for example: Zinkastaub UP6, from Umicore; |
| 5 wt % zinc lamellae | lamellar zinc particles, for example: Stapa Zn8, from Eckart. |

First of all the methylpolysiloxane is introduced, after which the metal particles (spherical and lamellar) are dispersed gradually by means of a dissolver at moderate stirring speed. The crosslinker, in the present case acetyl-aceto-titanate, is added, finally, at the end of the stirring operation, and is mixed in at moderate stirring speed.

Crosslinkers and polysiloxanes which are, alternatively, likewise highly suitable have been identified above in the description. The components stated above for the binder and the crosslinker are likewise used in the formulas set out in tables 1 and 2.

The anticorrosive coating composition thus produced can easily be stored for six months or twelve months. If it is likely that the coating composition is to be stored for longer than six months, it should be ensured that the metal particles present in the coating composition can be re-agitated, for example—as described above—by addition of lamellar metal particles.

Ungalvanized steel panels (DC 04 steel) are cleaned, initially by blasting with stainless steel particles, glass particles or garnet sand, subsequently by a hot alkaline degreasing with accompanying mechanical cleaning. The degreasing is carried out in the present case with an alkaline cleaning solution, for example Ridoline C 72 from Henkel, with a 4% solution for 1 minute at 70° C. Mechanical cleaning takes place by brushing. The cleaned steel panel is subsequently washed twice in demineralized water and dried using compressed air.

This is followed by pretreatment by dipping in a treatment solution which contains a titanium compound and which is sold under the trade name Bonderite 1455 by Henkel. Dipping in a 4% solution is carried out for 5 seconds, after which the excess is removed and the cleaned and pretreated steel panel is dried at 60° C.

The coating composition of the invention is then applied to the pretreated steel panel by spraying. Also possible, however, are the other methods of application identified above. The anticorrosive coating composition according to the invention can be applied in layer thicknesses of 5 μm to 100 μm; for the working examples presented here, for example, layer thicknesses each of 20 μm are applied. The layer thickness of 20 μm is achieved by spraying with a coating gun. After a residence time of 1 hour at room temperature, the anticorrosive coating composition is dust-dry.

Alternative coating compositions are set out in tables 1 and 2. The formulations of experiments 1 to 8 were produced in the same way as elucidated for the above working example.

TABLE 1

Anticorrosive coating compositions
(Comparative examples and inventive compositions)

| Formulation | 1* | 2* | 3 | 4 |
|---|---|---|---|---|
| Binder[1] | 36.5 | 36.5 | 29 | 28 |
| Crosslinker[1] | 1.5 | 1.5 | 1.0 | 1.0 |
| Zinc dust[1] | 60 | 60 | 70 | 70 |
| Zinc lamella[1] | 2 | 2 | — | 1 |
| Solvent[1] | — | — | — | — |
| Pretreatment | | | | |
| Cleaning | blasted | blasted | blasted | blasted |
| Phosphatizing/ conversion treatment | none | yes | yes | yes |
| Corrosion resistance | | | | |
| SST/red rust inhibition at the scribe mark | − | − | +/− | +/− |
| SST/red rust inhibition on the surface | + | + | + | + |
| Wet adhesion/adhesion in the SST | − | +++ | +++ | +++ |

*Comparative example
[1]FIGURES in wt %

TABLE 2

Anticorrosive coating compositions
(Inventive compositions)

| Formulation | 5 | 6 | 7 | 8 |
|---|---|---|---|---|
| Binder[1] | 10 | 15 | 14 | 10 |
| Crosslinker[1] | 5 | 1.5 | 1.4 | 0.8 |
| Zinc dust[1] | 83 | 81.5 | 77 | 88.5 |
| Zinc lamella[1] | 2 | 2 | 2 | 0.7 |
| Solvent[1] | — | — | 5.6 | — |
| Pretreatment | | | | |
| Cleaning | blasted | blasted | blasted | blasted |
| Phosphatizing/ conversion treatment | yes | yes | yes | |
| Corrosion resistance | | | | |
| SST/red rust inhibition at the scribe mark | +++ | +++ | +++ | +++ |
| SST/red rust inhibition on the surface | +++ | +++ | +++ | +++ |
| Wet adhesion/adhesion in the SST | +++ | +++ | +++ | +++ |

[1]FIGURES in wt %

In order to test the anticorrosive properties of the coating, which have been applied with the formulations above to an ungalvanized steel panel, seven days after the application of the coating, the coating was scored down to the steel panel and a neutral salt spray test was carried out. Parameters investigated and evaluated were the development of red rust both at the scribe mark and in the surface. The development of red rust provides information on the quality/activity of the cathodic corrosion control, which is characterized in that sites of damage to the surface coating offer no area for attack by red rust, with the damage instead being bridged electrochemically, provided it is not too extensive.

In the best versions, the coated steel panels exhibit red rust resistance at the scribe mark of more than 700 hours (evaluated as +++ in tables 1 and 2). However, red rust resistance of more than 500 hours (evaluated as ++) or red rust resistance of more than 300 hours (evaluated as +) is also acceptable for many applications. The fundamental usefulness of an anticorrosive coating which is achieved by applying the coating composition of the invention is obtained with a red rust resistance of more than 120 hours (evaluated as +/−); an unusable coating is identified in tables 1 and 2 as "−".

The evaluation of the anticorrosive properties of the coating produced by applying the coating composition of the invention to the metal substrate shows unexpectedly that the red rust resistance exhibits optimum results even when the pretreatment carried out was phosphatizing. Since in the majority of other surface coatings, phosphatizing leads to a reduction in the protective effect of subsequent cathodic coating compositions or coatings, this is seen as a particular quality feature of the coating of the invention.

The coating of the invention can be applied in an energy-saving way and with minimal expense and inconvenience, since the curing at room temperature means that no drying apparatus is necessary, and nor is any energy necessary for generating heat for curing and/or drying. Moreover, in this way it is also possible to coat metal substrates which cannot be coated in a coating line with drying apparatus, more particularly fixedly installed metal substrates, such as bridges, for example, or other edifices.

The invention claimed is:

1. An anticorrosive coating composition comprising at least one polysiloxane and metal particles and also at least one crosslinker, the coating composition crosslinking chemically at room temperature,
    wherein the polysiloxane has a weight-average molecular weight Mw in the range from 800 to 25 000 g/mol,
    wherein polysiloxane and crosslinker together form a reactive binder system
    wherein the fraction of the polysiloxane in the reactive binder system is more than 90 wt % and the complementary fraction of the crosslinker is less than 10 wt %,
    wherein the crosslinker is selected from the group of reactive silanes, silane hydrolysates, titanates, zirconates, organometallic compounds, acids and bases and mixtures thereof, and
    wherein the coating composition has a fraction of metal particles in the range from 70 to 98 wt %, based on the coating composition.

2. The anticorrosive coating composition according to claim 1, characterized in that the coating composition is free from water.

3. The anticorrosive coating composition according to claim 1, in that the coating composition comprises organic solvents in amounts of at most 3 wt %, based on the coating composition.

4. The anticorrosive coating composition according to claim 1, characterized in that the coating composition crosslinks in the presence of atmospheric moisture.

5. The anticorrosive coating composition according to claim 1, characterized in that the polysiloxane is a reactive polysiloxane.

6. The anticorrosive coating composition according to claim 1, characterized in that the polysiloxane has a weight-average molecular weight $M_w$ in the range from 1500 to 18 000 g/mol.

7. The anticorrosive coating composition according to claim 1, characterized in that the metal particles are selected from the group of zinc, aluminium, magnesium, manganese and nickel and/also mixtures and alloys thereof.

8. The anticorrosive coating composition according to claim 1, characterized in that the coating composition has a fraction of metal particles in the range from 80 to 96 wt %, based on the coating composition.

9. A method for coating a metal substrate with an anticorrosive coating composition, more particularly according to claim 1, comprising the following steps:
    (a) cleaning the metal substrate,
    (b) applying the anticorrosive coating composition, and
    (c) curing the anticorrosive coating to a dust-dry state at room temperature within a period of up to 300 minutes.

10. The method according to claim 9, characterized in that after cleaning has taken place, a pretreatment layer, more particularly a conversion layer, is applied to the metal substrate.

11. The method according to claim 10, characterized in that the pretreatment layer is obtainable by phosphatizing and/or chromating.

12. The method according to claim 9, characterized in that at least one further coating is applied to the anticorrosive coating.

13. A metal substrate coated with an anticorrosive coating comprising a matrix of a polysiloxane and at least one crosslinker and also metal particles.

14. The metal substrate according to claim 13, coated with an anticorrosive coating and also at least one further coating applied to the anticorrosive coating.

* * * * *

UNITED STATES PATENT AND TRADEMARK OFFICE
CERTIFICATE OF CORRECTION

PATENT NO. : 10,308,819 B2
APPLICATION NO. : 15/288288
DATED : June 4, 2019
INVENTOR(S) : Marcel Roth et al.

Page 1 of 1

It is certified that error appears in the above-identified patent and that said Letters Patent is hereby corrected as shown below:

In the Claims

Column 12, Line 46, please delete "more particularly" after "composition,".

Column 12, Lines 53-54, please delete "more particularly" after "layer,".

Signed and Sealed this
Twentieth Day of August, 2019

Andrei Iancu
*Director of the United States Patent and Trademark Office*